(12) United States Patent
Nessett et al.

(10) Patent No.: US 6,865,673 B1
(45) Date of Patent: Mar. 8, 2005

(54) METHOD FOR SECURE INSTALLATION OF DEVICE IN PACKET BASED COMMUNICATION NETWORK

(75) Inventors: Danny M Nessett, Fremont, CA (US); Clive Dolphin, St Albans (GB); Alexander S Brown, Hopkinton, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/532,050

(22) Filed: Mar. 21, 2000

(51) Int. Cl.[7] .............................. H04L 9/00; H04L 9/32; G06F 11/30; G06F 12/14; G06F 15/16
(52) U.S. Cl. ...................... 713/155; 713/154; 713/201; 709/225; 709/226; 709/228; 709/229; 380/247
(58) Field of Search ................................ 713/192, 191, 713/201, 154, 155, 182, 193; 380/247; 709/224, 225, 228, 229, 222, 226

(56) References Cited

U.S. PATENT DOCUMENTS

| | | | |
|---|---|---|---|
| 4,688,250 A | * | 8/1987 | Corrington et al. ......... 713/170 |
| 5,708,780 A | * | 1/1998 | Levergood et al. ......... 709/229 |
| 5,790,548 A | * | 8/1998 | Sistanizadeh et al. ....... 370/401 |
| 6,058,420 A | * | 5/2000 | Davies ........................ 709/224 |
| 6,151,679 A | * | 11/2000 | Friedman et al. ........... 713/201 |
| 6,393,565 B1 | * | 5/2002 | Lockhart et al. ............ 713/172 |
| 6,516,053 B1 | * | 2/2003 | Ryan et al. ................... 379/21 |

OTHER PUBLICATIONS

Arbaugh et al. "Network Working Group Internet Draft Authentication for DHCP Messages", Jun. 1999.*
Droms, Ralph. "Automated Configuration of TCP/IP with DHCP", Aug. 1999, IEEE.*
Schneier, Bruce. Applied Cryptography, Second Edition, 1996, John Wiley & Sons, Inc..*
Scourias, John. "Overview of the Global System for Mobile Communications", Oct. 1997.*

* cited by examiner

*Primary Examiner*—Gregory Morse
*Assistant Examiner*—Michael J. Simitoski
(74) *Attorney, Agent, or Firm*—Nixon & Vanderhye P.C.

(57) ABSTRACT

A method of installing a network device in a packet-based data communication network and checking the authenticity of the installation includes: (a) communicating identification information of the device to a management system; (b) installing the device; (c) obtaining from a protocol address administrator a protocol address for the device; (d) sending a communication from the device to the management system; (e) conducting a key agreement protocol exchange between the device and the management system to establish a set of encryption keys; (f) using the set of encryption keys to provide mutual authentication by the device and the management system; (g) associating, within the management system, the time of the communication in step (d) with the identification information and the protocol address of the device; and (h) communicating from the management system to the administrator a message including the identification information, the protocol address and the time.

4 Claims, 4 Drawing Sheets

METHOD FOR SECURE INSTALLATION OF DEVICE IN PACKET BASED COMMUNICATION NETWORK

FIELD OF THE INVENTION

This invention relates to the installation of a device in a packet-based communication network. The term 'device' is generally intended to refer a hardware device which can receive and forward addressed data packets and therefore includes such devices as repeaters (hubs), switches, bridges, routers and other devices which are connected by transmission media to constitute a network for the conveyance of data packets.

BACKGROUND TO THE INVENTION

As networks increase in size, they are becoming more difficult to manage. One problem in this regard is network device installation. To contain and reduce the burden on network administrators, manufacturers of equipment are adding 'plug and play' features to network devices. This means that the device does not need initial configuration to be performed manually, either locally or remotely, before the device is operational. However, little attention has been paid to the security implications of plug and play network device installation. Either the mechanisms developed do not address security or they presume security will be provided by means that are not in themselves plug and play (e.g. by manual configuration).

SUMMARY OF THE INVENTION

This invention is particularly concerned with the security of plug and play network device installation. It does so by specifying how devices securely make initial contact with a network or security management system; how the information exchanged during that contact is then used to distribute other information that is used subsequently for secure management: to distribute information that allows devices to be recontacted if and when a network or security management system crashes or loses its security state and how to recover from a catastrophic loss of security state in the system. A key idea of the invention is to use the uncertainty of when a device might be installed to detect unauthorized installations. This is preferably carried out using a process feedback loop that notifies organisations or personnel responsible for device installation the time and date when devices are installed. They can then check to determine if the installation was authorised. Preferably a record is kept of the devices installed by this process, which is periodically checked against a list of devices detected in the network by an automated sweep. This is intended to discover whether any devices have been spoofed by an unauthorised network or security management system during the plug and play device installation procedure.

DETAILED DESCRIPTION OF A PREFERRED EXAMPLE

Figure 1:
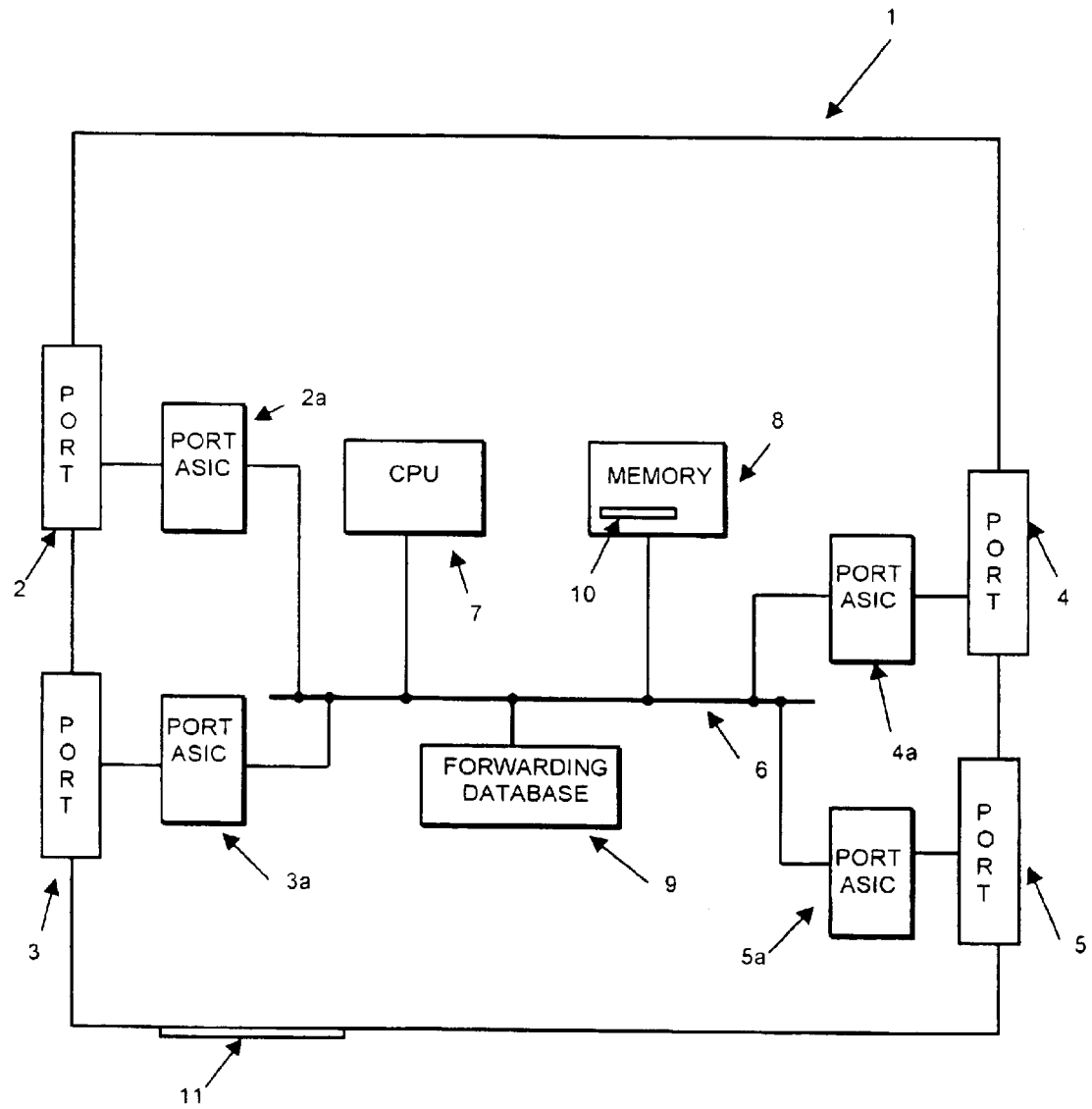
FIG. 1 illustrates a network switch.

FIG. 1 illustrates by way of example only a network switch, being a device of the kind which may be installed by a procedure according to the invention. To a large extent the organisation and architecture of the switch is not important provided that it has, as indicated later, some means of storing the information required by the present invention and performing the processing and information exchange subsequently required.

The switch 1 is represented to be a multi-port switch. Typically switches have up to two dozen or more ports but the switch shown in FIG. 1 is illustrated as having four ports 2, 3, 4 and 5. Each of these ports will include a physical layer device (not shown) and be associated with a port ASIC 2a, 3a, 4a and 5a respectively, which performs various media access control and storage of packets. The switch has a bus system 6 connecting the port ASICs with a central processor (CPU) 7, a memory 8 which may be used for the storage of packets received by the switch before they are forwarded from their destination port or ports and a forwarding database 9 which may have in accordance with ordinary practice a table associating packet addresses with port numbers. The address information may be 'layer 2' information or 'layer 3' information or both. As indicated previously, the architecture of the switch is not important and the foregoing is given only by way of example.

Figure 2:
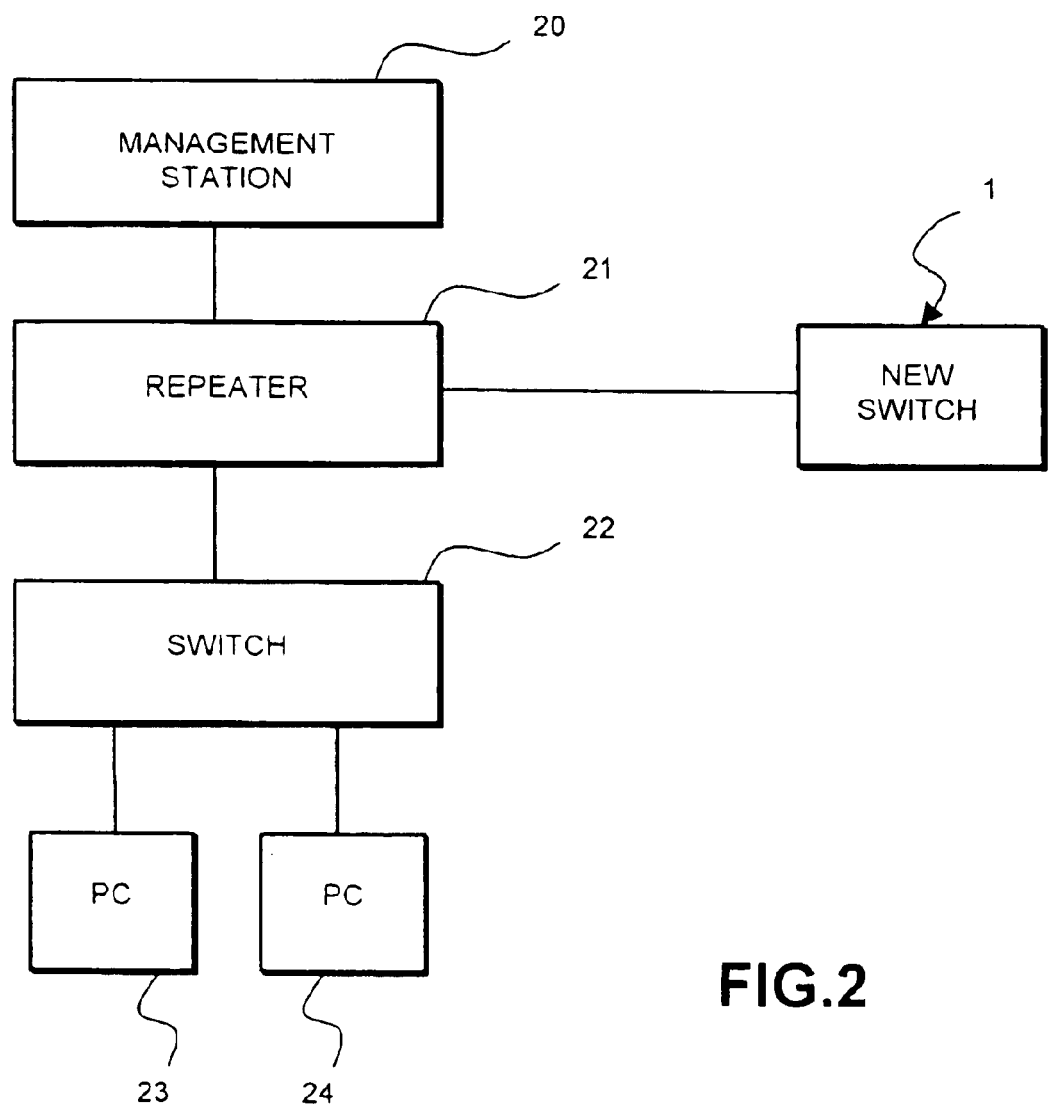
FIG. 2 illustrates a simplified network in which the switch is to be installed.

FIG. 2 illustrates a simple form of network, comprising a management station 20, a repeater 21, and a switch 22, which is connected to the repeater and is also connected by respective ports to two 'user' terminals, in this case personal computers (PCs) 23 and 24 The installation which is to be described will be that of a new switch (I) to the repeater 21.

Obviously in a simple form of network shown in FIG. 2 there is not the complexity which is characteristic of most network installations. In general however the addition of new devices such as switches and repeaters is necessary from time to time as a network is built up or expanded in capacity.

It is customary when installing new switches 1 in an existing network to perform manual configuration on the switch. Manual configuration would involve generating a set of security keys for the device and typing those security keys in via a terminal connected to the device prior to installation. The same security keys along with a device identifier, such as the device's serial number or IP address would then have to be typed into the security network management station.

Manual configuration is generally reckoned to be burdensome and error prone, and there is a growing preference for the manufacture of devices which can be regarded as 'plug and play' in that they require little more than the normal connection of connecting cables to their ports and powering up. Any automated configuration should not lose the security that a manual configuration offers. As indicated previously, the present invention is particularly concerned with the security of 'plug and play' network device installation.

Figure 3:
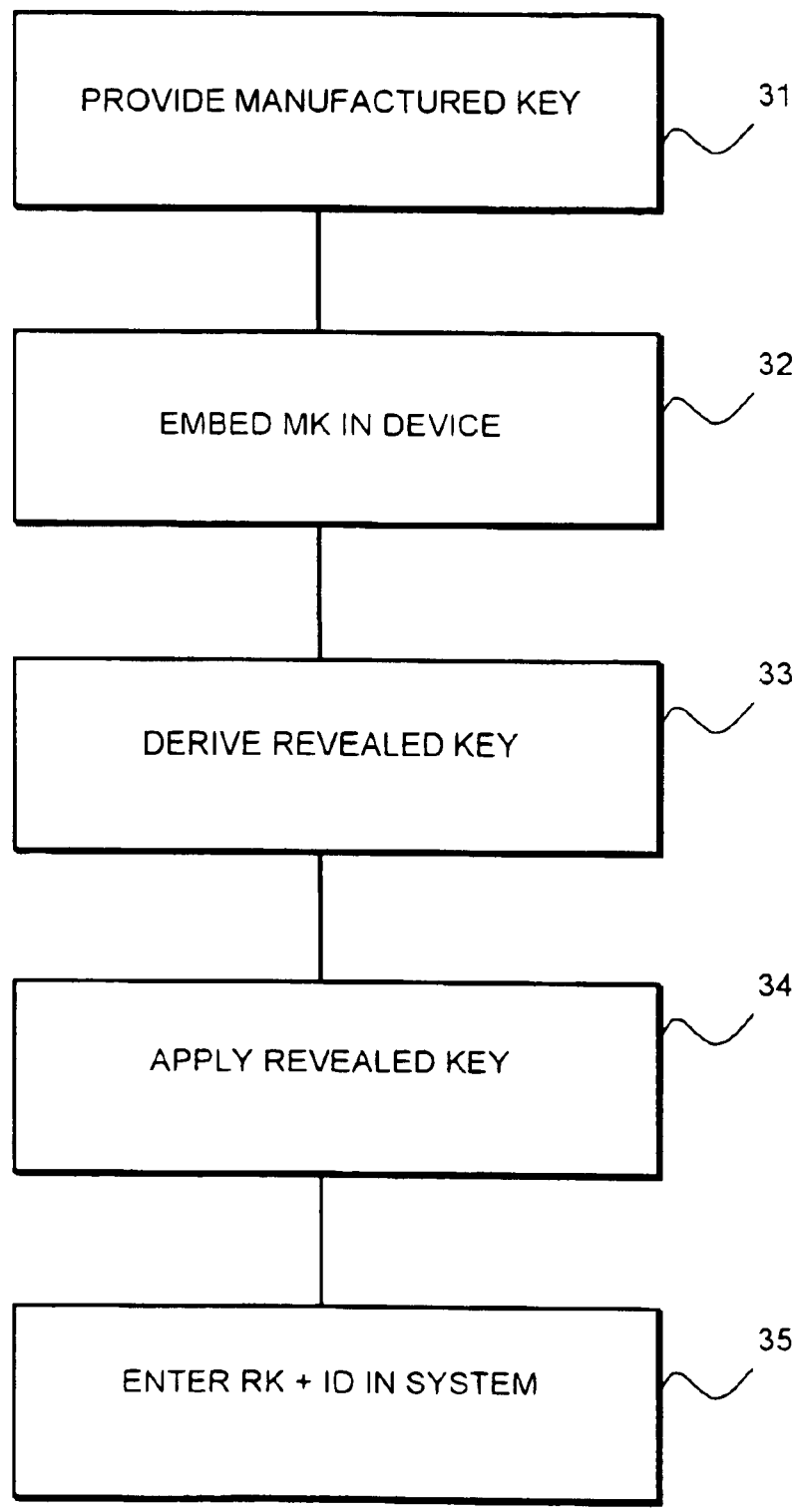
FIG. 3 is a schematic diagram of various steps preliminary to the installation of a device according to the invention

With reference to FIGS. 1 and 3, the approach taken by the invention is to place a secret value 10 (stored in permanent memory) into each network device that is unique to it during its manufacture (the 'manufactured key'), (stages 31 and 32 of FIG. 3). This key is then used to create (stage 33) another value (the 'revealed key') that may be applied (stage 34) to the device, for example on a label 11 attached to the device. There are various suitable algorithms that can be used to compute the revealed key from the manufactured key. In some situations a digital signature checksum, such as the ones produced by the HMAC-MD5 or HMAC-SHA-1 algorithms, might be computed using the manufactured key as the secret key and some other information, such as the device serial number, one of its MAC addresses and/or a random number as input. This has the advantage of protecting much of the entropy in the manufactured key, allowing it to be used again to generate another revealed key that is unpredictable. In other situations the algorithm might be the identity function, whereby the manufactured key and revealed key are identical. Prior to installation, the revealed key is read and associated with other identification information (e.g., the device's serial number) and entered into a network or security management system that will cooperate with the device during subsequent plug and play installation. Reading the revealed key and the associated identification can be a manual process or it can be facilitated through devices such as bar code readers or text scanners.

The security of the revealed key is suspect, since it is available for view by intruders as well as authorized personnel. One fundamental idea in this invention is how to use the revealed key in such a way as to make it difficult for an intruder to use it. This is preferably done by providing a feedback loop in the installation process that checks to ensure installation occurs in an authorized manner.

After the revealed key and identification information are entered into the network or security management system, the device can be installed at any subsequent time. The invention relies on ensuring that the time of device installation not be known or predictable ill advance by an intruder. One way to achieve this is for the entry of the device information (i.e., the revealed key) and other identification information into the network or security management system to occur when the device arrives at the customer premises before it is stored for future installation. The device would then be installed at a point in time decided by the customer and unknown to an intruder.

Once the revealed key and its associated network device information is available in the network or security management system, a network administrator can install a network device using the secure plug and play process specified by the invention. The procedure followed during this process is intended to thwart three security threats:

(a) masquerade by a rogue network or security management system as an authorised network or security management system in a way that allows it to manage installed devices without detection by authorised staff;

(b) snooping by an intruder oil the transactions between an authorised network or security management system and a device during plug and play installation in a way that allows the intruder to gather security information that will protect subsequent communications; and (c) masquerade by a rogue network device to a network or security management system in a way that allows it to pose as all authorised network device.

Figure 4:
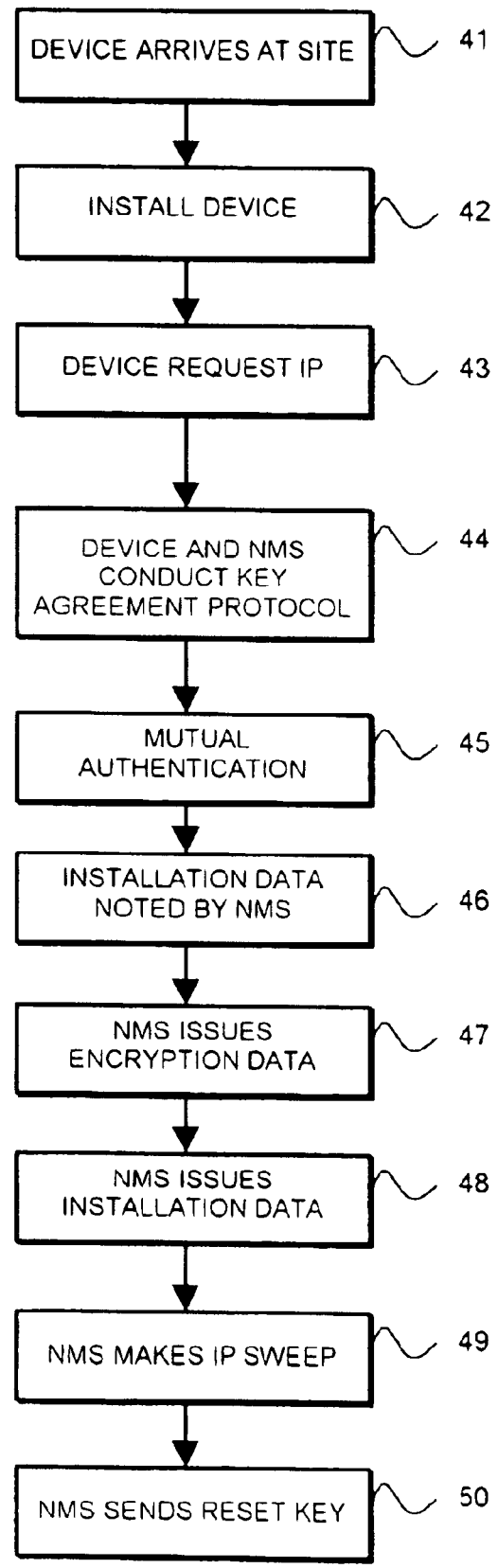
FIG. 4 is a diagram illustrating the steps associated with installation of a device according to the invention.

The procedure shown in FIG. 4 is as follows:

(i) The device 1 arrives at the site (stage 41) where it will be subsequently installed (stage 42). At a time before it is installed and in a way that doesn't allow someone to predict when it will be installed, the device identification information including the revealed key are read and communicated to the network or security management system (stage 35, FIG. 3). Reading can be done manually, using a bar code reader or using some other automated process.

(ii) A network administrator decides to install the device. This must occur in a time window that is not predictable by a network intruder. The length of the time window can be chosen by the customer.

(iii) The device 1 is connected to another network device that is currently operational in the network. The device 1 being installed broadcasts (stage 43) a request for a protocol (e.g. IP) address for its own use as well as the protocol address of a network or security management system to contact for registration. Such broadcast may use the BOOTP protocol, the DHCP protocol or some other protocol that allows a device to obtain the necessary information.

(iv) The device contacts the network or security management system whose protocol (IP) address is obtained during step (iii). The device and network management system conduct a key agreement protocol exchange (stage 44) to establish a set of encryption keys that can be used for confidentiality protection. This requires no advance sharing of state between the two parties. Such an exchange does not authenticate either party to the other. It simply establishes a cryptographically protected channel that no party other than the two that conducted the exchange can read. Examples of key agreement protocols with the appropriate properties are Diffie-Hellman key agreement and Shamir's three-pass protocol. For the remainder of description the assumption is made that the key exchange protocol is Diffie-Hellman.

The network security management system may optionally reject the connection from the device if connection occurred outside of the window of time the customer allocated to installation of the device. In this case a record is kept of the date and time of the failed configuration and the IP address of the device; this is used in stage (viii).

(v) The device and network or security management system use (stage 45) the cryptographically protected channel to mutually authenticate each other (actually, prove to each other that each knows the revealed key). Mutual authentication can occur using any protocol that relies on the knowledge by both parties of a shared secret (in this case the revealed key). A common protocol of this type is a two-way challenging-response. This operates as follows. One party (the first) issues a challenge and the other party (the second) uses the revealed key to compute a response. The first party uses the revealed key to compute the response it expects and compares it with the value received. If they match, the second party has authenticated itself to the first. Then the second party issues a challenge and the first party uses the revealed key to compute a response. If the response received from the first party matches that expected by the second party, the first party is authenticated.

A preferred implementation of this procedure has the device create a challenge, and then send it using the cryptographically protected channel to the network or security management system, which uses the revealed key to return a response. The response is checked by the device and if it matches that expected, the network or security management system has authenticated itself to the device. Either as part of the message carrying the response or in a separate message carried over the cryptographically protected channel, the network or security management system sends a challenge. The device computes the response and returns it over the cryptographically protected channel to the network or security management system, which checks it against the response it expects. If they match, the device has authenticated itself to the network or security management system.

A preferred way to compute the challenge is to generated a random or pseudo-random number. One way to compute the response is to use the revealed key as the secret input to an HMAC-MD5 or HMAC_SHA-1 computation and the challenge as the non-secret input.

(vi) The network management system notes (stage 46) the date and time that the contact was made and associates with it the device identification information and the IP address of the device. This record is used in step (viii) of this procedure.

(vii) The network or security management system produces a set of random numbers for distribution to the device (stage 47). These will be used as encryption keys protecting subsequent communications using other protocols between the network management system and the device. It records these keys (the Work Keys) in a data structure that associates them with the device information. It then sends the Work Keys over the cyptographically protected channel to the device where they are stored. Examples of protocols for which these keys might be used are SNMPv3, RADIUS, and the Wireless Equivalent Protocol of 802.11.

The process described in this invention may also be used to achieve plug and play registration of the network device with the public key infrastructure (PKI). In that case, the procedure described above is carried out between the device and a special security management system called a registration authority (described in standard RFC 2510 published by the Internet Engineering Task Force). During these steps the registration authority authenticates the device and then interacts with a certification authority (RFC 2510) to obtain a public/private key pair and a certificate for the public key. The registration authority then communicates the private key and the public key certificate to the device over the cryptographically protected channel.

If there is more than one network or security management system that manages the device, the network or security management system that distributes the work keys and/or private key with public key certificate to the device uses a secure channel to move them to those other systems. Examples of secure channels are an IPSec protected network file system protocol IPSec protected distributed database protocols and a transport layer security (TLS) protected hypertext transfer protocol.

Using the D-H based cryptographic channel to distribute work keys and/or a private key with public key certificate for subsequent use addresses threat (b) above.

(viii) The network or security management system communicates (stage 48) to the individual or organisation responsible for the IP address used by the device that a device using the identification information provided was installed at the date/time noted in the record produced at stave (vi). The person or organisation responsible for the IP address used by the device then checks to ensure the device installation occurred at that specified date/time and that the installation was authorised.

Information on any connections rejected at stage (iv) is also passed on to the individual or organisation responsible for the IP address that was rejected.

An important feature of the invention is the information loop established when the network or security management system records when the device was installed, and sends that information to the person or organisation responsible for that IP address that information being then checked for validity. It is this loop that enables the detection of installation of unauthorised devices, since even if an intruder gains access to the revealed key and the device identification information, he will not know when that device should be installed. The record communicated to the appropriate person or organisation that is responsible for the IP address will be able to recognise unauthorised installations. This feature of the invention addresses threat (c) above.

(ix) The network or security management system periodically sweeps (stage 49) through all the addresses in all subnets for which it is responsible. This sweep, which can be implemented using PING (see RFC 792) or another probing mechanism, identifies all devices in the network. The network management system then compares the list formed by the sweep with a list constructed from the records it compiles in step (vi). If it discovers there are devices on the network that have not registered themselves (or been registered is some other way in the case of equipment without a plug and play installation capability), it notifies the appropriate network administrators, who can then determine whether the device is legitimate or not.

Sweeping for devices that have not been registered will catch any devices that have been spoofed by a rogue network or security management system, and deals with threats (a) above.

(x) In addition to sending the work keys over the D-H based cryptographic channel, the network or security management system sends to the device over the cryptographic channel a reset key (stage 50). This key is stored by the device and recorded by the network or security management system on removable or other recoverable storage. Reset keys may be unique to each installed device, unique to a croup of devices or they may be one key for all the devices managed by a (set of) network or security management systems.

If the network or security management system fails in a way that it loses the work keys for the devices it manages a reconstituted network or security management system can use the reset keys to re-establish contact with those devices. It does this by sending a special command to each device and includes in it a message digest of the command using the reset key as the secret value. This command instructs the device to participate in a Diffie-Hellman key agreement exchange with the network or security management system. After this exchange, the corresponding cryptographic channel based on that exchange is used to distribute new work keys for the dependent protocols. In addition the network or security management system sends to the device a new reset key and records it on removeable or other recoverable storage.

If a catastrophic system failure occurs whereby the network or security management system loses the current work keys for devices as well as the reset keys for those devices, management of the device can be recovered as follows:

A terminal connection is established to the device through a physically secure or operationally secure means. The device is then instructed to generate a new revealed key from the manufactured key (see above for a description of how to generate a revealed key from a manufactured key). The revealed key is displayed over the terminal connection. When instructed to create this revealed key, the device sends network management alarms to the network or security management system. This is to protect the device against intruder initiated penetration attempts.

The revealed key is communicated to the network or security management station and the device is then instructed through the terminal connection in initiate a plug and play device installation procedure as described above.

There are several exception situations that must be handled by the plus and play installation) procedure. These are:

(1) If a device initiates a D-H exchange but it does not complete within a certain time interval, the device abandons the attempt. It then begins the exchange sequence from scratch. This guards against an intruder's attempt to crypto-analyze the D-H exchange by blocking communications for a long period of time, giving it time to do the analysis.

(2) After the D-H based cryptographic channel is established, if work keys and/or private key/public key certificate are not communicated to the device within a specified interval of time, the device abandons the plug and play device installation attempt. This also guards against crypto-analysis attack.

What is claimed is:

1. A method of installing a network device in a packet-based data communication network and checking the authenticity of the installation, said method comprising:

(a) communicating identification information of the device to a management system;

(b) installing said device;

(c) obtaining from a protocol address administrator a protocol address for said device;

(d) conducting a key agreement protocol exchange between said device and said management system to establish a set of encryption keys;

(e) using said set of encryption keys to provide mutual authentication by said device and said management system;

(f) associating within said management system, the time of said exchange in step (d) with said identification information and the protocol address of the device;

(g) communicating from said management system to said administrator a message including said identification information, said protocol address and said time;

wherein, after said step (f) said management system produces further encryption keys for subsequent communications between said management system and said device; and wherein said management system sends to said device a reset key enabling reiteration of a key agreement protocol exchange corresponding to step (d).

2. A method as in claim 1 and further comprising periodically sweeping through all addresses available to said management system and comparing said addresses with addresses of devices compiled by means of step (e).

3. A method according teas in claim 1 wherein said identification information includes a revealed encryption key.

4. A method as in claim 3 wherein said device has stored therein a manufactured encryption key which is related to said revealed encryption key.

* * * * *